Patented Dec. 12, 1950

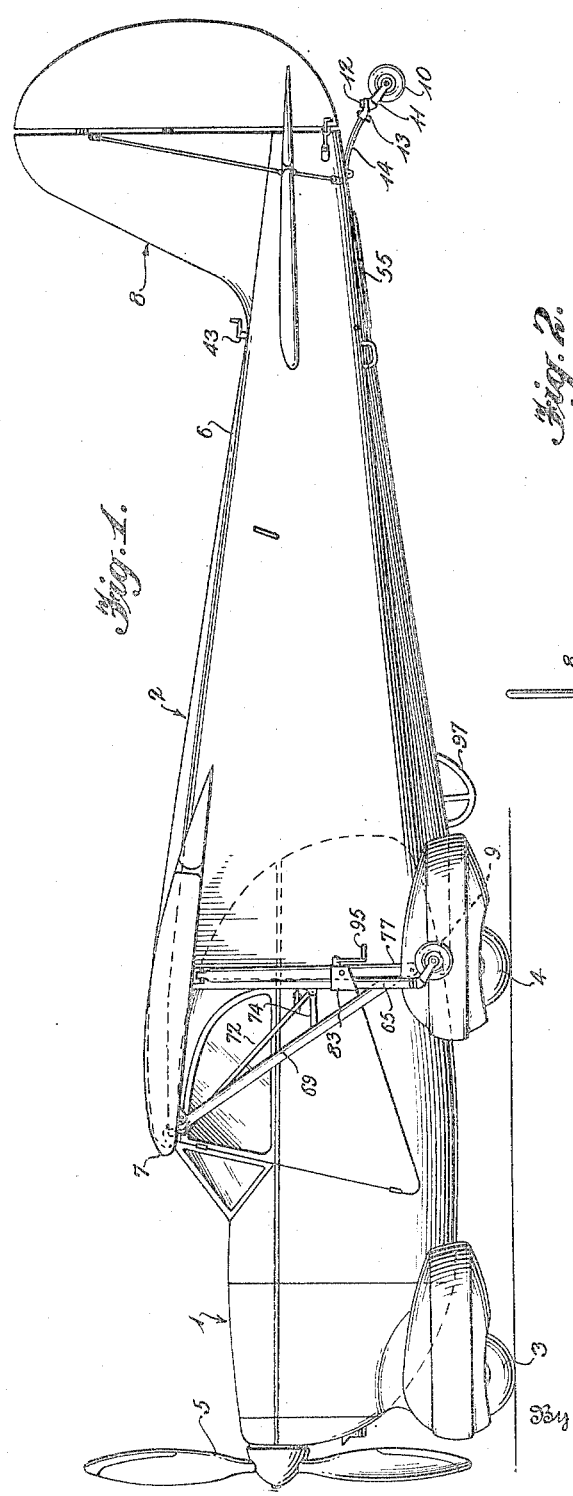
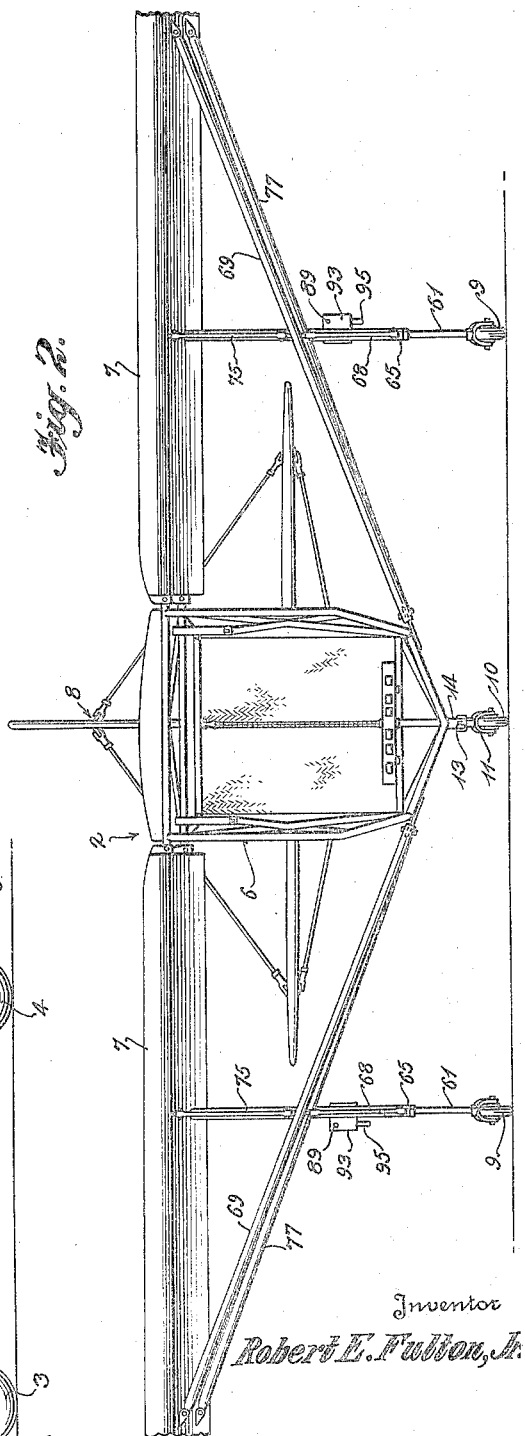

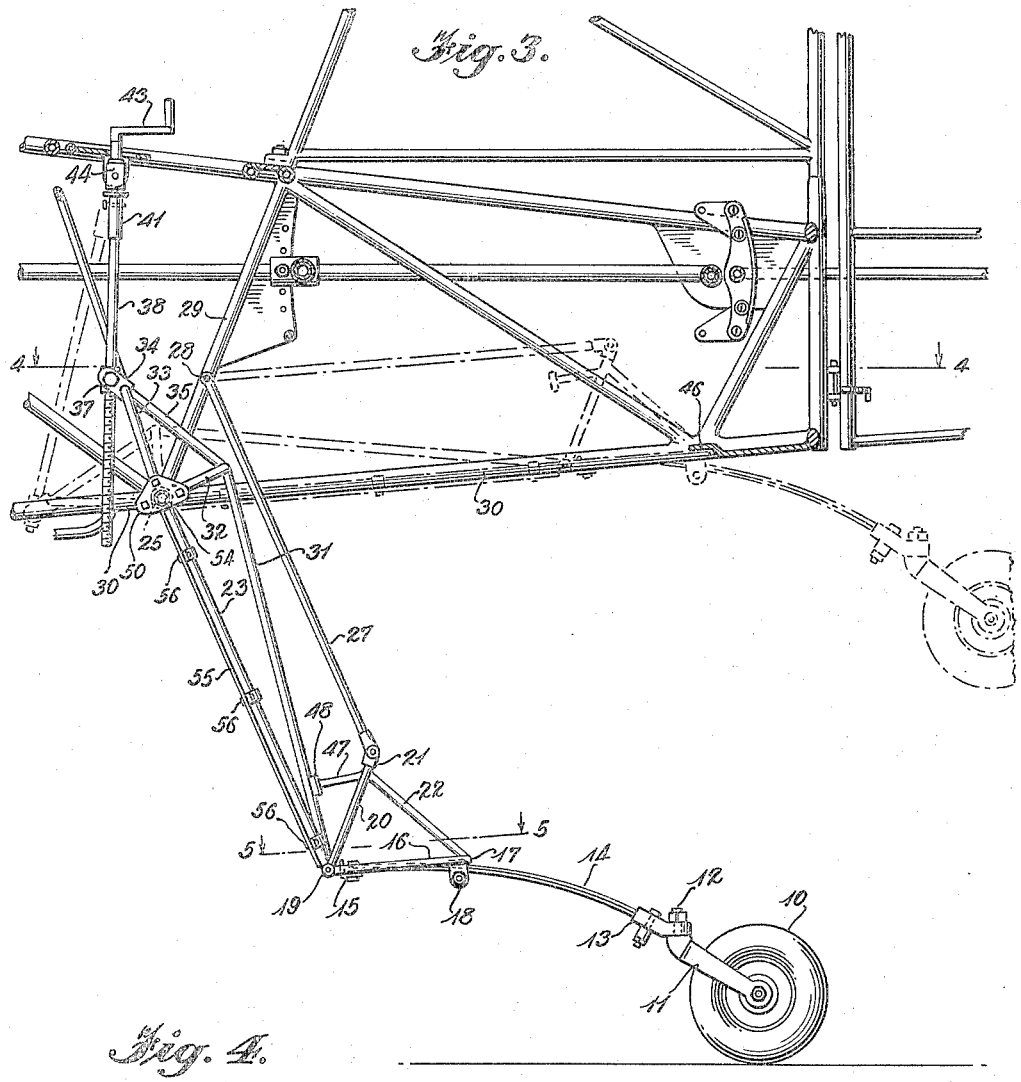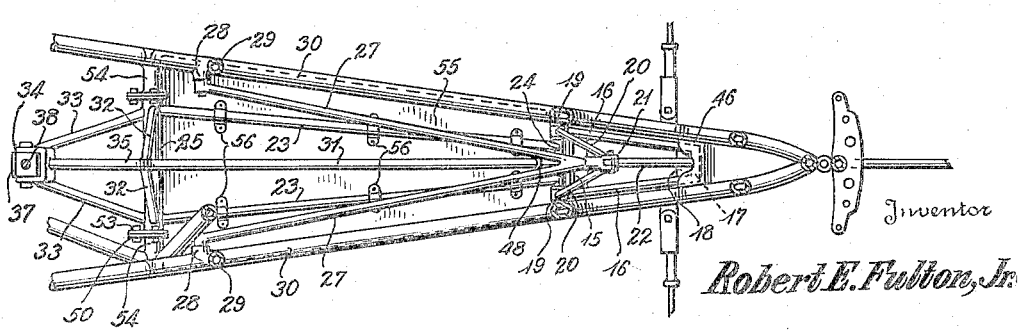

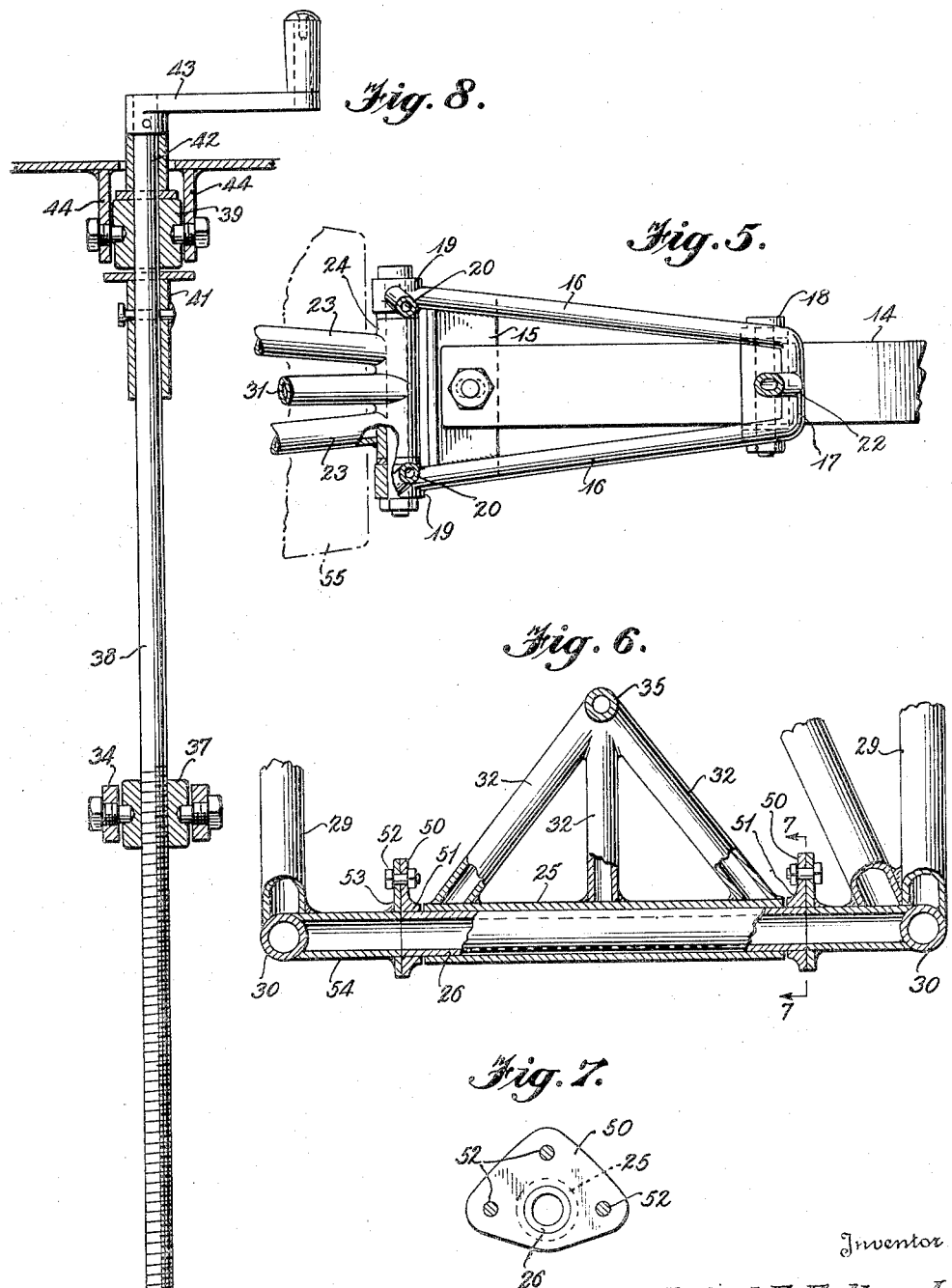

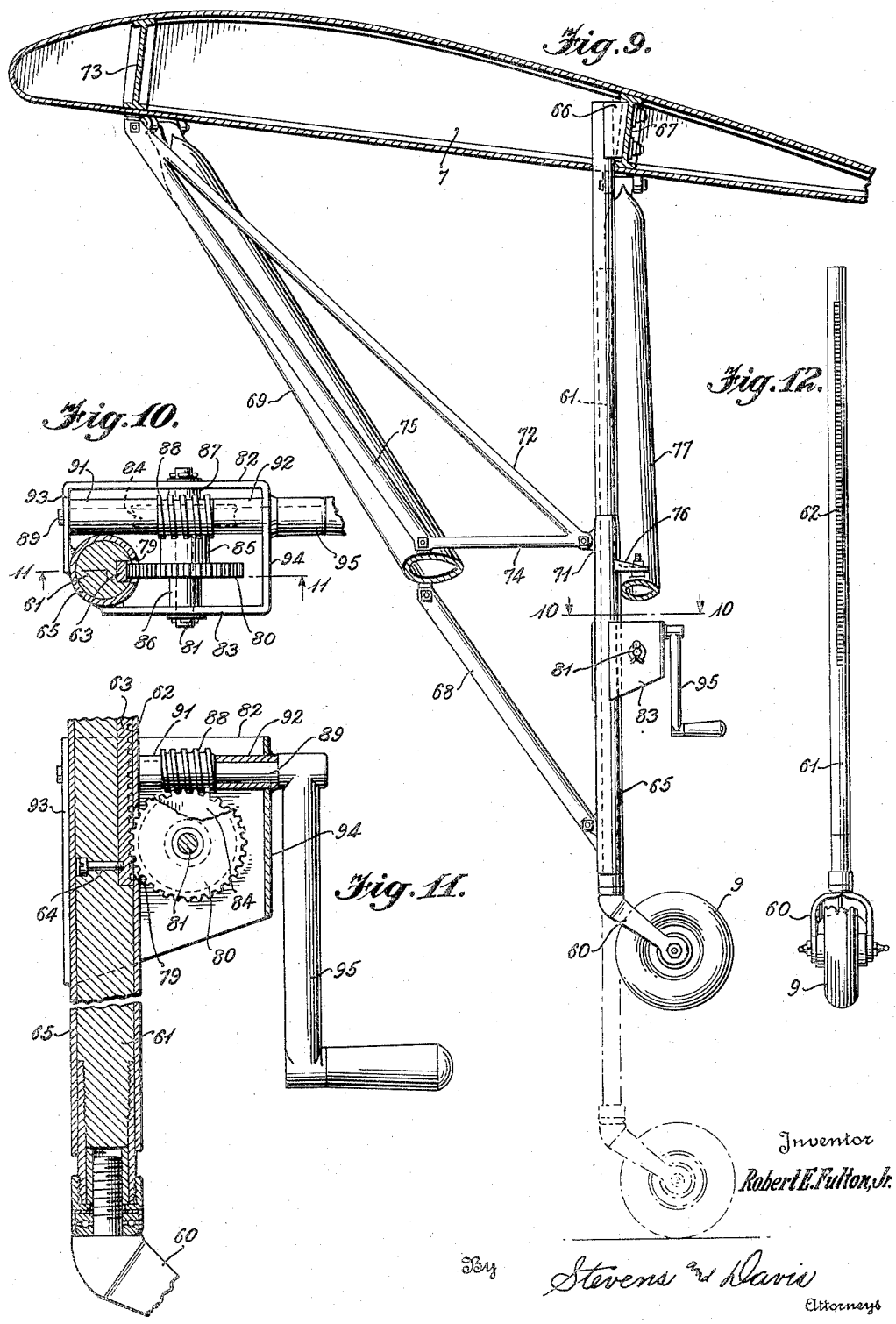

2,533,925

UNITED STATES PATENT OFFICE 2,533,925

ROADABLE AIRPLANE

Robert E. Fulton, Jr., Washington, D. C., assignor to Continental, Incorporated, Washington, D. C., a corporation of Connecticut Application March 3, 1945, Serial No. 580,843

2 Claims. (Cl. 244—2)

This invention relates to a vehicle primarily intended for use as an airplane in which a section containing the power unit and the operator's controls may be separately used as an automobile.

The history of the airplane is almost as old as that of the automobile. Both appeared at approximately the turn of the century. Yet today, almost a half a century later, there are a very large number of automobiles in this country to every one privately owned airplane.

Such a condition is the result of certain basic shortcomings in the airplane. Airplanes require airports to operate. Airports are of necessity located on the outskirts of communities, not infrequently at considerable distance. Thus the time saved by the speed of aerial transportation is more frequently than not consumed by the ground-travel time required to get from the airport to the flier's final destination.

Furthermore, the expense of travel between the airport and the community, usually involving taxis, is not inconsiderable. When to this is added the initial cost and upkeep of the airplane plus that of an automobile which the flier undoubtedly owns as well, it is obvious why few can afford to own an aircraft.

The average automobile ride from point of origin to destination is not over five miles. For every automobile trip of several hundred miles, the average man makes as many as a hundred short local trips. Since he can afford only an automobile or an airplane, his choice is obvious.

This has been the basic factor in retarding widespread public adoption of the airplane in the past and, unless remedied, will have a serious effect on its future. Various endeavors have been made to circumvent the situation. Closer-to-town airports, locally available cars for rent, and other expedients have been offered but they fail to solve the basic practical and economic problems.

While the real cure has been much discussed, little or nothing of a practical nature has been executed to carry it into effect. Obviously there is much in common between an automobile and an airplane. Both have wheels, a body, a cab or cabin, a motor, and controls for starting, guiding and stopping. When a pilot leaves his aircraft at an airport and takes a cab to town he is leaving behind 90% of the basic elements of an automobile—an expensive and unnecessary procedure which has done more than any other thing to stifle aviation.

Others have recognized this fundamental problem and have made efforts to solve it by accomplishing a transition from airplane to car and back. But the problem has many aspects—mechanical, aerodynamic, practical, safety, economy, comfort, service and maintenance, public reaction and acceptance. Of the several suggested solutions which have been offered to date, all have failed due to neglect of one or more of the above features. Most have been so radical in conception and based on such untried principles that they have failed to hold public interest. Others have made contributions which, unless supplemented by many additional features, were of little practical value.

It is an object of this invention to produce a roadable airplane by making a practical combination of already accepted forms and styles of automobile and aircraft designs, thereby making the final unit one of greater public value by virtue of its ready acceptance resulting from its being basically a combination of already familiar elements.

The present invention therefore is concerned with an airplane having a removable section adapted for use as a standard automobile and an airplane section comprised of wings, fuselage and flight control surfaces, having cooperating interlocking means on the airplane and automobile sections by which the sections may be firmly held together to establish a complete airplane. The invention contemplates the provision of means on the airplane section for supporting it above the ground, when separated from the automobile section, in the same position which it would occupy if it were attached to the automobile section.

The invention, moreover, provides adjustable supports for the airplane section so that it may be brought to the position which will relieve the interlocking means between the sections of supporting stresses so that the interlocking means can be more easily disengaged or reengaged when the sections are to be separated or united. As the supports are adjustable the airplane section may be tilted to a position to agree with that position of the automobile section.

The invention further contemplates a construction in which the airplane section may be maintained in elevated position upon adjustable supports provided with wheels whereby the structure may be moved to suitable storage without the necessity of connecting the automobile section thereto.

Also, the invention makes it possible to tie the airplane section down to the ground in a manner customary for airplanes, when the airplane section is to be left by itself in a field. In securing the airplane section in this manner, the supports provided by the invention are relieved of the major part of their load bearing stresses.

Other features of the invention will be apparent from the following description and from the drawings, in which:

Figure 1 is a side elevation of the vehicle as it appears when the automobile and airplane sections are assembled for flight.

Figure 2 is an elevation of the airplane section alone, looking into the end which is attached to the automobile section.

Figure 3 is a side elevation of the rearward portion of the airplane section, the enclosing covering being removed to show the structure of the rear landing and supporting wheel support.

Figure 4 is a plan view on the line 4—4 of Figure 3.

Figure 5 is a plan view on the line 5—5 of Figure 3, on an enlarged scale.

Figure 6 is an elevation of the main bearing for the rear wheel support, on an enlarged scale.

Figure 7 is a section on the line 7—7 of Figure 6.

Figure 8 is a vertical section through the crank and screw shaft for operating the rear wheel, on an enlarged scale.

Figure 9 is a side elevation of the support at the forward end of the airplane section.

Figure 10 is a section on the line 10—10 of Figure 9 on an enlarged scale.

Figure 11 is a section on the line 11—11 of Figure 10.

Figure 12 is an elevation of the rack bar to which the forward wheel is attached.

The vehicle as it appears when the automobile and airplane sections are combined for flight, is shown in Figure 1. The automobile section is indicated at the forward end by the reference numeral 1, and the airplane section is indicated at the rearward end by the reference numeral 2. These two sections are held together by any suitable means and since it forms no part of the present invention as herein described and claimed, it is not illustrated here. One example of a suitable connection is that illustrated in application Serial No. 580,844, filed March 3, 1945.

The automobile section 1 includes the front wheels 3 and rear wheels 4 and a motor to which the propeller 5 is attached. Also included in this section is a steering mechanism, a driving connection from the motor to one or more wheels, and the usual manually controllable devices associated in an automobile and in an airplane.

The airplane section 2 includes the usual fuselage portion 6 and to it are attached the forward lifting wings 7 and the usual tail surfaces indicated generally at 8. In addition, the airplane section includes linkages and connections operated by the pilot for manipulating the movable control surfaces of the airplane section. These linkages and connections must be broken or disconnected when the sections are separated but the means for accomplishing this constitutes no part of the present invention. One manner of accomplishing this is disclosed in application Serial No. 580,842, filed March 3, 1945, now Patent 2,430,869, issued November 18, 1947.

When the automobile and airplane sections are combined, the automobile section rests upon its front and rear wheels 3 and 4, and is of sufficient weight to support the airplane section as a cantilever, as is shown in Figure 1. The wheel 10 carried beneath the tail section, may contact the ground during landing, but when the airplane is at rest this wheel 10 is held above the ground as shown in Figure 1. Wheels 9, which are suspended beneath each wing 7 are also held in an elevated position as is shown in Figure 1 when the airplane is in use.

Just prior to the time that the automobile section 1 and airplane section 2 are to be disengaged from each other, the invention contemplates the movement of the two forward wheels 9 and the rear wheel 10 downward to the ground, as is shown in Figures 3 and 9. These wheels 9 and 10 will then support the airplane section independently of its attachment to the automobile section, and this will relieve the supporting stresses on the interconnecting means so that the automobile section may then be disconnected and driven off. The airplane section will remain independently supported as shown in Figure 2, in readiness to receive and be reattached to the automobile section.

As the wheels 9 and 10 provide a three point support for the airplane section 2 and they are each independently adjustable as will be explained, this section may be adjustably supported in the same position which it would occupy if it were attached to the automombile section 1. This makes it possible to compensate for any unevenness in the ground at the location where the disconnection and reconnection of the sections takes place.

The lining-up of the interengaging means between the sections is therefore facilitated. This makes it possible for one person to disconnect and reconnect the automobile and airplane sections. After the airplane section is reconnected to the automobile section, the vehicle is made ready for flight by the elevation of wheels 9 and 10 as shown in Figure 1, but if through oversight, the wheels are not elevated, the airplane may take off and land safely.

The rear wheel 10 is rotatably mounted between the arms of a forked member 11; see Figure 3. This forked member 11 is swiveled at 12 in a bracket 13 to which is clamped the leaf-spring 14. It will be noted that the swivel 12 is vertical so that wheel 10 may freely caster to any position rearwardly from the direction of movement of the airplane. It may be mentioned that instead of the wheel 10, a conventional skid may be employed as the tail support.

The forward end of the leaf-spring 14 is bolted to a cross bar 15 extending between the side arms 16 of a frame member; see Figures 3 and 5. At their rearward extremities, the side arms 16 are joined by an end piece 17. Beneath this end piece 17 is a clamp 18 to which the spring 14 is attached. Arms 16 are provided with bearings 19 at their corresponding forward ends and attached to these bearings 19 are strut members 20 which converge to a bearing at 21. A brace member 22 extends from the strut members 20 at a point close to the bearings 21, to the end piece 17 at the rear ends of the side arms 16. The arms 16, strut members 20 and brace member 22 therefore constitute a rigid triangle which will resist deformation under impact loads.

Fitting between and journaled to the bearings 19 is a sleeve 24 and to this sleeve are attached frame arms 23. At their divergent ends the frame arms are attached to a sleeve 25 which is journaled upon a cross member 26 (Figure 6) of the airplane framework. This cross member 26 is readily removable, as will be described.

Pivotally attached to the bearing at 21 are the convergent ends of link members 27, which are pivotally attached at 28 to the uprights 29 of the fixed framework of the airplane. These uprights 29, see Figure 3, extend downwardly to the longerons 30 at points in line with the axis of the bearing at 25.

The distance between the pivots at 25 and 28 is equal to the distance between the bearings at 19 and 21, and the length of the frame arms 23 are preferably equal to the length of the links 27 so that a parallelogram is defined by the elements 20, 23, 27 and the portion of the uprights 29 lying between the bearings at 25 and 28. This parallelogram relationship is maintained throughout the different positions that these supports may assume when the wheel is retracted or projected.

As is shown in Figure 3, when the wheel 10 is in its upper, retracted position shown in dotted lines, the leaf-spring 14 is disposed substantially horizontally so that it may readily flex under the pressure which may be imposed upon the wheel 10 by its possible contact with the ground in landing. As a consequence, the leaf-spring 14 lies close to the underside of the airplane and the wheel 10 and its supporting fork 11 are disposed also close to the framework of the airplane for landing. When the wheel is in its lower, projected position shown in full lines in Figure 3, the leaf-spring 14 still maintains a substantially horizontal position which is parallel to that which it assumes in its retracted position. The parallelogram arrangement of the linkage mechanism is of importance because it maintains the spring 14 and the pivot 12 in their most advantageous positions for flexure of the spring and pivoting of the wheel, in both the retracted and projected positions of the wheel 10.

To move the linkage above-described which supports the wheel 10, the frame arms 23 are made part of a rigid framework which includes the strut 31 connected at one end to the sleeve 24 adjacent the bearings at 19. At its other end the strut 31 is connected to the junction point of uprights 32 the lower ends of which are attached to the sleeve 25 as best shown in Figure 6.

Attached to the sleeve 25 and extending therefrom in a direction substantially opposite from the arms 23 are arms 33 which converge at a yoke 34 to which they are attached. A brace 35 is attached to the yoke 34 and to the uprights 32 at their point of connection to the strut 31. The framework made up of the members 33, 23, 31, 32 and 35 constitutes a rigid trusswork, as appears from the side elevation of Figure 3.

Between the arms of the yoke 34 is a nut 37 which is trunnioned to these arms as shown in Figure 8. Screw-threaded within the nut 37 is a shaft 38 which also passes through a bearing block 39 in which it is freely rotatable. The bearing block 39 is held against endwise displacement along the shaft 38 by means of a collar 41 secured to the shaft beneath the nut 39, and a sleeve 42 above the nut 39 and extending to the affixed crank 43. The bearing block 39 is trunnioned in plates 44 on opposite sides thereof and which are attached to the fixed framework of the airplane.

The above mounting of shaft 38 permits its rotational movement and also its pivotal movement about the trunnions for bearing block 39, but prevents endwise movement of the shaft. As a consequence, rotation of shaft 38 by hand crank 43 causes up or down movement of nut 37 and this swings the framework which includes the arms 33 and 23, about the bearing at 25. By turning the crank 43, which as shown in Figure 1 is readily available on the top side of the fuselage 6, the wheel 10 may be moved to its retracted or projected position.

To limit the upward movement of the framework which carries the wheel 10, under the action of crank 43 and especially against shocks on the wheel 10 during landing, a cross plate 46 is affixed between the longerons 30 toward their rearward ends. This plate 46 is in position to be borne upwardly against by the end piece 17 and a portion of the side arms 16, as appears from Figure 4. This provision relieves the actuating frameworks of forces imposed by landing.

To strengthen the actuating framework for wheel 10 when the wheel is in its projected position, a stop member 47 is affixed to the junction point of strut members 20 and brace member 22. This stop member has a pressure pad 48 at its free end to bear against the strut 31 when the wheel 10 is in its downwardmost position. As appears from Figure 3, upward pressure on wheel 10 when in its projected position is largely sustained by pressure of the stop 47—48 against strut 31, instead of by the link members 27. The link members do not therefore have to be made strong enough to sustain compression loads.

It has been noted that the cross member 26 upon which the sleeve 25 is journaled, is removable from the airplane framework. This is accomplished, as is best shown in Figure 6 by affixing the ends of the cross member 26 to flanges 50 as by welding at 51. Flanges 50 may be attached by bolts 52 to complementary flanges 53 which are secured as by welding to the inner ends of extensions 54. The extensions 54 are attached to the longerons 30 at the points of attachment thereto of the uprights 29.

It will be appreciated that it is necessary to have an opening through the underside of the fuselage 6 which is large enough for the movement therethrough of the arms 23 and arms 16. As it is desirable that this opening be closed when the airplane is in flight and the wheel 10 is in its retracted position, a plate 55 is secured by clamps 56 to the underside of arms 23. When the wheel 10 is retracted, plate 55 lies against the underside of the fuselage 6.

The means by which the wheels 9 beneath each lifting wing 7 may be elevated or lowered, is shown in Figures 9–12. A description of one of these means for one wheel 9 will suffice for an understanding of the corresponding means for the wheel 9 on the other side of the airplane. The wheel structure to the left of Figure 2 will accordingly be described.

Wheel 9 is rotatably mounted between a forked member 60 which is swiveled to the lower end of a rack shaft 61. Rack teeth 62 are formed along one side of the shaft 61, as by the insert bar 63 held in place by screws 64. The rack shaft 61 is telescopic within the tubular member 65.

Tubular member 65 is attached by a bracket 66 at its upper end to a beam 67 within the wing 7. At its lower end, the tubular member 65 is attached by a tie rod 68 to the forward strut 69 for the wing 7. To further strengthen the tubular member 65, it is attached at a bracket 71 centrally of its length to a tie rod 72 which is secured at its upper end to a spar 73 within the wing 7. A brace 74 extends from bracket 71 to the wing strut 69 and from this latter point of attachment a tie bar 75 extends upwardly to the spar 73.

On its rearward side, tubular member 65 is attached by a bracket 76 to a rearward wing strut 77. Through the interconnection afforded by the tubular member 65 and its connection to struts 69 and 77, not only is the tubular member rigidly supported, but the wing 7 is more firmly supported.

To move the rack shaft 61 up and down in the tubular member 65, a rack gear 80 is provided to mesh with the teeth 62 through an opening 79 in the wall of the tubular member 65. Gear 80 is rotatable upon a cross pin 81, the ends of which pass through opposite walls 82—83 of a gear box affixed to the tubular member 65.

Also rotatably mounted upon pin 81 is a worm gear 84 and this gear 84 is affixed to the gear 80 through a connecting sleeve on hub 85. The gears 80 and 84 are held in proper endwise position on pin 81 by means of spacers 86 and 87.

Meshing with worm gear 84 is a worm 88 which is pinned to a shaft 89. Shaft 89 turns in the bearings 91 and 92 which are secured to the opposite end walls 93 and 94 of the gear box. Attached to the shaft 89 outside of the gear box is a hand crank 95 by which the shaft 89 may be manually rotated.

Rotation of hand crank 95 in the proper direction will raise or lower wheel 9, as is desired. Any adjustment in position of either wheel 9 on opposite sides of the fuselage 6 may be independently obtained. The presence of the worm in the gear system will cause the wheels 9 to remain in any adjusted position, as the worm resists a rotation under pressure of the worm gear 84.

As has been pointed out, therefore, the adjustment of wheels 9 and 10 makes it possible readily to support the airplane section 2 in the same position it would assume if it were attached to the automobile section. This makes it possible readily to disengage or reengage these sections. Moreover, since the airplane section is carried upon wheels 9 and 10 when it is apart from the automobile section, it may be easily wheeled to any desired location.

When the airplane section 2 is disengaged from the automobile section 1, the airplane section may be housed under cover, as in a hangar or garage. It may be necessary however to leave the airplane section in an open field and to secure it to the ground with tie ropes that are ordinarily provided at air fields for this purpose. In this event it is desirable that the wheels 9 and 10 and their supporting structures be relieved to the extent possible, of the need for carrying the full weight of the airplane section.

To support the forward portion of the airplane section and take the load off the supports for wheels 9, a skid 97 is secured to the framework beneath this portion. The wheels 9 are elevated by turning the cranks 95 until the skid 97 contacts the ground and the wheels 9 are then further slightly elevated so as to be slightly above the ground but in a position to prevent any extreme lateral tipping of the airplane section. The tie ropes are then attached to the tips of the wings to prevent them from lifting under the influence of a wind.

The tail wheel 10 may be allowed to remain in its lowered position shown in full lines in Figure 3 when the airplane section is alone and resting on the skid 97, but it is preferable that it be moved to the position of Figure 1 so as to bring the tail surfaces closer to the ground and relieve the framework attached to the wheel 10 of the load of supporting the tail portion of the airplane section. When the tail wheel 10 is in its retracted position the plate 46 directly bears the load, as has been explained. The tail portion will also be tied to an anchoring cord to overcome the tendency of a wind to lift the tail surfaces.

After the airplane section has been tied down in this manner, in order to return it to the position to be attached to the automobile section, it is elevated by turning the hand cranks 43 and 95. It is possible in this manner to readily align the interlocking elements so that they may be easily engaged.

What is claimed is:

1. A vehicle comprising an automobile portion having supporting wheels, a separable aircraft portion having wings and tail structure, interengaging means for retaining said portions in assembled relation for flight of the vehicle, the aircraft portion being supported as a cantilever by said automobile portion when they are so connected, a separately adjustable support carried by the aircraft portion beneath each wing for holding the forward end of the aircraft portion elevated above the ground in the desired position when the automobile portion is to be removed from or recoupled to the aircraft portion, castered wheels at the lower ends of each of said adjustable wing supports, a tail support including a castered supporting wheel, and means for adjustably positioning said tail support without tilting the axis of castering whereby it may function in its upward position as a tail support for the assembled vehicle when necessary and be moved downwardly away from the tail structure to support the rear end of the aircraft portion in a higher position above the ground when the automobile portion is to be removed.

2. A vehicle comprising an automobile portion having supporting wheels, a separable aircraft portion having wings and tail structure, interengaging means for retaining said portions in assembled relation for flight of the vehicle, the aircraft portion being supported as a cantilever by the said automobile portion when they are so connected, a tail support on the airplane portion having a castered wheel at its lower end, and means for adjustably positioning said tail support whereby it may function in its upward position as a tail support for the assembled vehicle when necessary, and be moved downwardly away from the tail structure to support the rearward end of the aircraft portion in a higher position when the automobile portion is to be removed, said means for adjustably positioning said tail support including a parallelogram structure that lowers said tail support without tilting the axis about which the wheel is castered.

ROBERT E. FULTON, Jr.

REFERENCES CITED

The following references are of record in the file of this patent:

UNITED STATES PATENTS

| Number | Name | Date |
|---|---|---|
| 1,105,462 | Sjolander | July 28, 1914 |
| 1,113,063 | Spencer | Oct. 6, 1914 |
| 2,215,003 | Johnson | Sept. 17, 1940 |
| 2,348,869 | Wagner | May 16, 1944 |

FOREIGN PATENTS

| Number | Country | Date |
|---|---|---|
| 559,819 | Great Britain | Mar. 7, 1944 |